United States Patent
Ishii et al.

(10) Patent No.: US 8,636,037 B2
(45) Date of Patent: Jan. 28, 2014

(54) FLEXIBLE TUBE FOR FLUID TRANSPORT

(75) Inventors: Kenichi Ishii, Tokyo (JP); Hiroki Manabe, Tokyo (JP); Michimasa Watanabe, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/593,136

(22) Filed: Aug. 23, 2012

(65) Prior Publication Data
US 2013/0037160 A1 Feb. 14, 2013

Related U.S. Application Data

(63) Continuation of application No. PCT/JP2011/053989, filed on Feb. 23, 2011, which is a continuation of application No. PCT/JP2010/052857, filed on Feb. 24, 2010.

(51) Int. Cl.
*F16L 11/12* (2006.01)

(52) U.S. Cl.
USPC ........... 138/134; 138/135; 138/129; 138/172; 138/133

(58) Field of Classification Search
USPC ......... 138/135, 134, 155, 129, 174, 133, 130, 138/172
See application file for complete search history.

(56) References Cited

U.S. PATENT DOCUMENTS

| | | | |
|---|---|---|---|
| 2,640,501 A * | 6/1953 | Scott et al. | 138/132 |
| 4,402,346 A | 9/1983 | Cheetham et al. | |
| 4,657,049 A * | 4/1987 | Fourty et al. | 138/133 |
| 4,773,151 A | 9/1988 | Griffiths et al. | |
| 5,176,179 A * | 1/1993 | Bournazel et al. | 138/130 |
| 5,269,349 A * | 12/1993 | Sugier et al. | 138/172 |
| 5,275,209 A * | 1/1994 | Sugier et al. | 138/135 |
| 5,406,984 A * | 4/1995 | Sugier et al. | 138/135 |

(Continued)

FOREIGN PATENT DOCUMENTS

| | | |
|---|---|---|
| GB | 2169913 A | 7/1986 |
| JP | 54128022 A | 10/1978 |

(Continued)

OTHER PUBLICATIONS

International Search Report for PCT/JP2010/052857 mailed May 25, 2010.
International Search Report for PCT/JP2011/053989 mailed May 24, 2011.

*Primary Examiner* — Patrick F Brinson
(74) *Attorney, Agent, or Firm* — Lowe Hauptman & Ham, LLP

(57) ABSTRACT

In a flexible tube for fluid transport, a resin layer is on the outer periphery of an interlocked tube for shielding the fluid flowing within the interlocked tube. An internal-pressure-resistant reinforcing layer is on the outer periphery of the resin layer for reinforcing primarily against internal pressure, etc. of the fluid flowing within the interlocked tube. An axial-force reinforcing layer is on the outer periphery of the internal-pressure-resistant reinforcing layer for primarily suppressing the interlocked tube from deforming in the axial direction of the flexible tube. The axial-force reinforcing layer is formed from alternately winding two layers of reinforcing strips with a long pitch. The reinforcing strips are each configured from a metal strip, a resin layer that covers the strip, and the like. The resin layer is resin to which a microparticulate sulfide-trapping material has been added.

7 Claims, 7 Drawing Sheets

(56) References Cited

U.S. PATENT DOCUMENTS

| | | | |
|---|---|---|---|
| 6,110,550 A | 8/2000 | Jarrin et al. | |
| 6,401,760 B2 * | 6/2002 | Espinasse | 138/135 |
| 6,668,866 B2 * | 12/2003 | Glejbøl et al. | 138/134 |
| 6,679,298 B2 * | 1/2004 | Espinasse | 138/172 |
| 6,843,278 B2 * | 1/2005 | Espinasse | 138/134 |
| 6,899,140 B2 * | 5/2005 | Fraser et al. | 138/134 |
| 6,966,344 B2 * | 11/2005 | Coutarel et al. | 138/129 |
| 7,891,384 B2 * | 2/2011 | Binet et al. | 138/135 |
| 2004/0261878 A1 * | 12/2004 | Jung et al. | 138/135 |
| 2010/0089481 A1 * | 4/2010 | Bectarte et al. | 138/130 |

FOREIGN PATENT DOCUMENTS

| | | |
|---|---|---|
| JP | 61048693 A | 3/1986 |
| JP | 61055491 A | 3/1986 |
| JP | 01278339 A | 11/1989 |
| JP | 04288920 A | 10/1992 |
| JP | 07156285 A | 6/1995 |
| JP | 10160057 A | 6/1998 |

* cited by examiner (a)

(b)

(a)

(b)

(a)

(b)

(a)

(b)

FLEXIBLE TUBE FOR FLUID TRANSPORT

RELATED APPLICATIONS

The present application is a continuation of International Application Number PCT/JP2011/053989, filed Feb. 23, 2011, which is a continuation of International Application Number PCT/JP2010/052857, filed Feb. 24, 2010.

TECHNICAL FIELD

Present invention relates to a flexible tube for fluid transport in order to convey oil and gas produced from the offshore seabed oil field etc.

DESCRIPTION OF BACKGROUND ART

Conventionally, oil and the like produced from an offshore seabed oil field are conveyed to a floating oil production facility by a flexible tube for fluid transport. An internal-pressure-resistant characteristic, a fluid-tight property, waterproof property and the like are required for the flexible tube.

For such a flexible tube for fluid transport, for example, an interlocked tube made of stainless steel, which is excellent in flexibility, in external pressure-resistant reinforcement and in lateral pressure-resistant reinforcement at the time of installation, is used for an innermost layer. A plastic inner tube which is excellent in oil proof property and in fluid-tight property is provided to the outer periphery of the innermost layer. A metallic internal-pressure-resistant reinforcing layer for internal-pressure-resistant reinforcement and a metallic axial-force reinforcing layer for the axial direction reinforcement are further provided to its outer periphery. A plastic sheath as a waterproof layer is provided to the outermost layer (Patent document 1).

RELATED ART DOCUMENT

Patent Documents

Patent Document 1

Japanese Unexamined Patent Application Publication No. H7-156285

DISCLOSURE OF THE INVENTION

Problems to be Solved by the Invention

However, so much (several tens ppm or more) hydrogen sulfide which is a corrosive gas may be contained sometimes in the crude-oil components pumped up from the seabed. If a flexible tube for fluid transport like that in Patent document 1 conveys crude oil containing such high content of hydrogen sulfide as described above, hydrogen sulfide may leak out in the diameter direction from the plastic inner tube and may corrode the metallic reinforcing layers provided to the outer periphery of the plastic inner tube.

A metallic axial-force reinforcing layer is provided for axial direction reinforcement to the flexible tube for fluid transport of Patent document 1, but a longer flexible tube for fluid transport needs to be used when the oil and gas are pumped up from the deeper seabed. Thus, whole weight of such a flexible tube for fluid transport increases. Therefore, the axial-force reinforcement to bear this heavy weight is needed. In order to obtain such higher axial-force reinforcement, it is necessary to use a metal with higher strength.

On the other hand, for the internal-pressure-resistant reinforcing layer, low-carbon steel with about 1,000 MPa tensile strength is usually used and heat treatment is performed on the steel for improvement of corrosion-resistance. By the heat treatment, both the strength and the corrosion resistance of the internal-pressure-resistant reinforcing layer can be obtained.

However, as described above, the axial-force reinforcing layer (the reinforcing strips) needs to have 1,700 MPa or more tensile strength in order to resist the hanging load caused by weight and the axial direction tensile load caused by the high inner pressure. For this reason, high carbon steel is usually used. However, since tensile strength of the high carbon steel falls remarkably if it is heat-treated like the low-carbon steel, there is a problem that both the corrosion resistance and the intensity are difficult to be held at the same time.

The present invention is made in view of such problems. It aims to provide a flexible tube for fluid transport that is excellent in the axial direction strength and has a simple structure that can prevent deterioration and corrosion of the metallic reinforcing layer by the corrosive gases contained in the fluid flowing inside the tube.

Means for Solving Problems

In order to achieve the aims described above, the present invention is a flexible tube for fluid transport, comprising at least: a tube body having flexibility, a resin layer provided to the outer periphery of said tube body, an internal-pressure-resistant reinforcing layer provided to the outer periphery of said resin layer, an axial-force reinforcing layer provided to the outer periphery of said internal-pressure-resistant reinforcing layer, and a protective layer provided to the outer periphery of said axial-force reinforcing layer; wherein said axial-force reinforcing layer is formed from reinforcing strips comprising a metallic strip body coated by coating resin.

The adhesive strength between said coating resin and said strip body has desirably peel strength of 10 N/cm or more according to the 180° peel test (peer test at an angle of 180°) prescribed by ISO8510-2-ASTMD903.

Said coating resin is desirably made of adhesive resin chosen from among adhesive polyolefin system resin, adhesive fluorine system resin, polyamide system hot melt resin, epoxy system resin, acrylic system resin, unsaturated polyester system resin, phenol system resin, melamine system resin, urea system resin, silicone system resin, urethane system resin, and polyimide system resin.

It is desirable that an outer layer side resin layer is further provided to the outer periphery of said coating resin, and thus the resin layer on the outer periphery of said strip body has at least two-layer structure, and that the abrasion resistance of said outer layer side resin layer has the abrasion loss of 30 mg/1000 times or less in the Taber abrasion test prescribed by ISO9352 ASTMD1044. Said outer layer side resin layer is desirably made of resin chosen from among polyethylene system resin, polypropylene system resin, polyamide system resin, fluorine system resin, polyester system resin, styrene system resin, acrylic system resin, polyvinyl chloride, modified polyphenylene ether, and polyphenylene sulfide.

Surface treatment may be performed on the surface of said strip body. In this case, surface roughening treatment or a surface plating process for roughening the surface may be performed on the surface of said strip body. Or, said strip body may be made of high carbon steel with the carbon content of 0.8% or more, and a plating treatment layer containing Sn, Zn, Cu, or Ti as the main ingredient may be formed on the surface of said strip body. Or said strip body may be made of high carbon steel with the carbon content of 0.8% or more, and on the surface of said strip body, a clad layer may be formed by cladding low-carbon steel or aluminum on the surface of said strip body.

It is desirable that at least either said coating resin or said outer layer side resin layer functions as a sulfur shielding layer, and the resin constituting said coating resin or constituting said outer layer side resin layer is blended with a sulfide-trapping material which can react with sulfur and/or sulfides, and that said sulfide-trapping material is desirably chosen from among Zn, Sb, Pb, Fe and Cd series metals, compounds of these metals, and their complexes.

It is desirable that at the surface region of the resin constituting said coating resin or constituting said outer layer side resin layer, a reaction layer is formed while the flexible tube is in use, due to the reaction of the sulfur components contained in the fluid flowing within said tube body with said sulfide-trapping material, and it is also desirable that the infiltration index of the sulfur components into said reaction layer is smaller than its infiltration index into resin regions other than said reaction layer.

According to the present invention, since the reinforcing strip constituting the axial-force reinforcing layer is configured from a metallic strip body and resin layers coating the strip body, corrosive gases from the fluid flowing inside the tube body can be prevented from reaching the metallic strip body of the reinforcing strip. Thus corrosion of the axial-force reinforcing layer can be prevented. In this way, both high axial force and high corrosion resistance can be obtained, by improving the corrosion resistance of the highly strong axial-force reinforcing layer made of high carbon steel, for example. Here, the corrosion resistance of the internal-pressure-resistant reinforcing layer can be increased by the heat treatment method or the like.

Because the reinforcing strip has at least two layers consisting of the coating resin layer on the inner layer and the outer layer side resin layer on the outer layer, different characteristics can be given to the inside layer and to the outside layer. If the resin constituting the coating resin layer has stronger adhesiveness to the strip body than the resin constituting the outer layer side resin layer, exfoliation from the strip body can be prevented and long term reliability can be obtained. If abrasion resistance of the resin constituting the outer layer side resin layer is better than that of the resin constituting the coating resin layer, the reinforcing strip is not worn by the friction between the reinforcing strips when the flexible tube is bent.

In particular, if adhesive strength between the coating resin and the strip body is 10 N/cm or more peel strength according to the 180° peel test prescribed by ISO8510-2-ASTMD903, exfoliation of resin layers can be prevented certainly. As for the abrasion resistance of the outer layer side resin layer, if the abrasion loss is less than 30 mg/1000 times in the Taber abrasion test prescribed by ISO9352 ASTMD1044, functions of the resin layer will not fall.

The corrosion resistance can be improved further by performing surface treatment (for example, plating treatment or cladding low-carbon steel or aluminum) on the surface of the strip body.

Especially, if plating treatment is performed on the lower layer using, as the main component, Sn, Zn, Cu or Ti having sulfur shielding effect, a corrosion-resistant effect can be acquired more certainly.

In order to make at least either the coating resin layer or the outer layer side resin layer to function as the sulfur shielding layer, a sulfide-trapping material is blended into the resin layer, then the sulfide-trapping material can react with the sulfides (the sulfur components) from the fluid and a stable reaction product can be formed. The stable reaction product has a minute crystal structure, and remarkably reduces the infiltration index (diffusion coefficient) of sulfur as compared with a simple resin (a resin not containing the reaction product). In this way, a minute reaction layer is formed on the surface of the resin layer by the reaction between the resin layer and the sulfur components in the fluid.

That is, sulfur components in the fluid form a minute reaction layer on the surface layer in the cross section of the resin layer, and at the same time its infiltration (diffusion) to the inside of the reinforcing strip (in the direction to the strip body) is prevented by the reaction layer which is formed by itself. Thus, infiltration (diffusion) of the sulfur components in the direction to the strip body can be prevented certainly. Therefore, the sulfur components will not leak onto the surface of the strip body. The resin material of the resin layer can be chosen, primarily taking the compatibility with the sulfide-trapping material etc. into consideration.

If surface roughening treatment or plating treatment having surface roughening effect is performed on the surface, the adhesion property between the strip body and the resin layer can be improved.

Effects of the Invention

According to the present invention, a flexible tube for fluid transport can be provided, which excels in the axial direction strength, and has a simple structure which can prevent deterioration and corrosion of the metallic reinforcing layers caused by the corrosive gases contained in the fluid flowing inside the tube.

BRIEF EXPLANATION OF THE FIGURES

FIG. 1(a) is a perspective view and FIG. 1(b) is a sectional view of the flexible tube.

FIG. 2(a) is a perspective view and FIG. 2(b) is the enlarged view of the region A in FIG. 2(a).

FIG. 4(a) is the enlarged view of the region B in FIG. 3 and FIG. 4(b) is the enlarged view of the region D in FIG. 4(a).

FIG. 7(a) is a perspective view and FIG. 7(b) is the enlarged view of the region F in FIG. 7(a).

DESCRIPTION OF EMBODIMENTS

Figure 1:
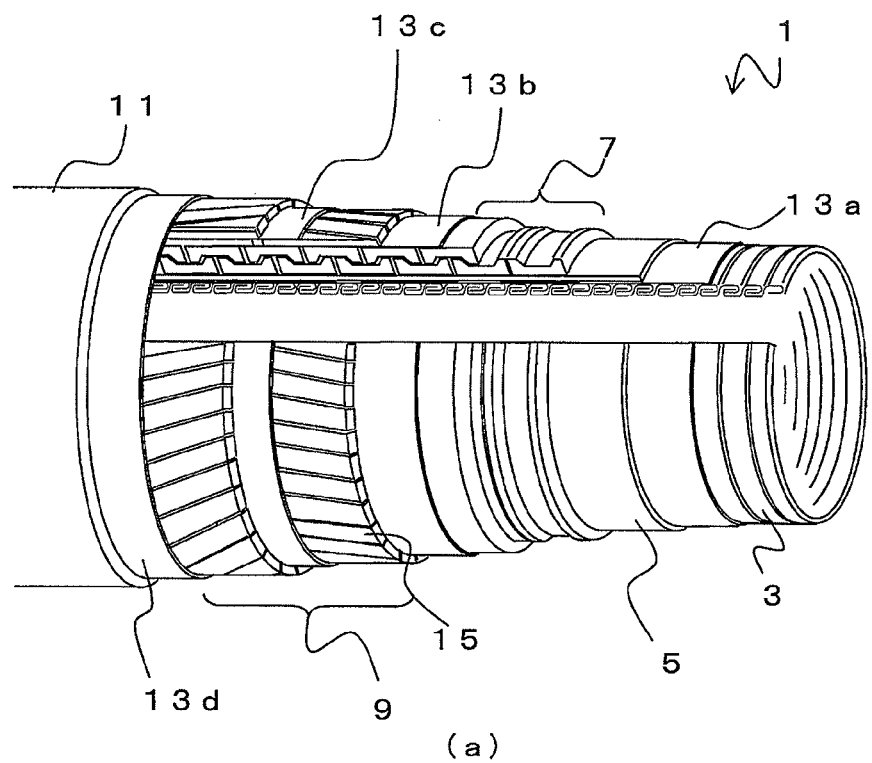
FIG. 1 show a flexible tube (1).
Figure 1:
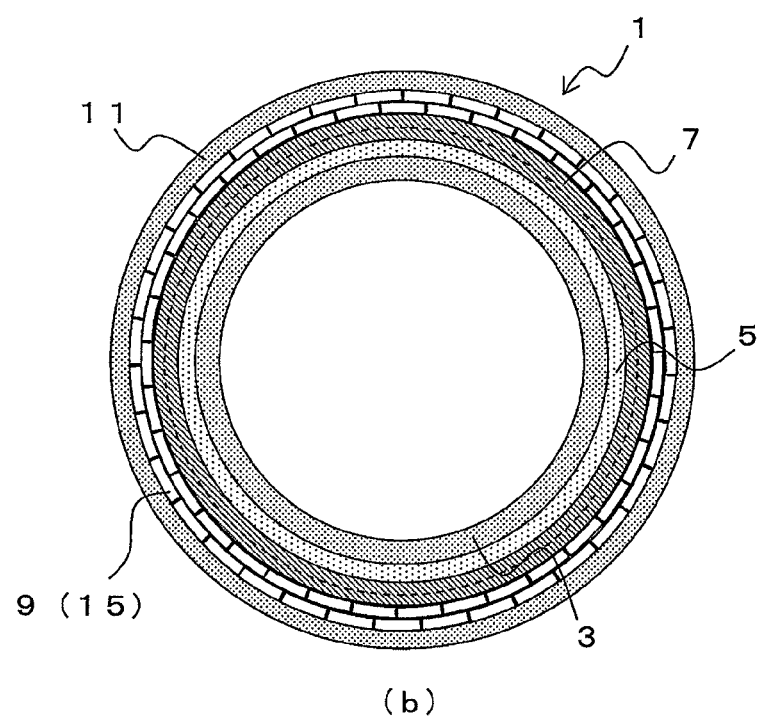

Based on figures, the embodiment of the present invention is described in detail below. FIG. 1 show a flexible tube (1). FIG. 1(a) is a perspective view and FIG. 1(b) is a sectional view. The flexible tube (1) comprises mainly an interlocked tube (3) as the tube body, a resin layer (5), an internal-pressure-resistant reinforcing layer (7), an axial-force reinforcing layer (9), a protective layer (11), seat layers (13a), (13b), (13c), and (13d), and the like.

The interlocked tube (3) is located at the innermost layer of the flexible tube (1) and is made of stainless steel which is excellent in the buckling strength to the external pressure and also has good corrosion resistance. The interlocked tube (3) is configured from tapes molded in S shape at the cross-section which are connected by engaging the S shapes with each other, and thus the tube has flexibility. The interlocked tube (3) is possible to be replaced by a tube of another embodiment, if it has the same flexibility and is similarly excellent in buckling strength.

A resin layer (5) is provided to the outer periphery side of the interlocked tube (3). The resin layer (5) shields the fluid flowing inside of the interlocked tube (3). For the resin layer (5), for example, polyamide system resins, or poly-vinylidene fluoride (PVDF) which bears a high temperature more than 90° C., and is also excellent in oil resistance, etc. can be used. The outer periphery side of the interlocked tube (3) means the outside of the interlocked tube (3) in the cross-section, and also includes the situation having other layer structures between the interlocked tube (3) and the resin layer (5). In the following explanations, it is needless to say that, when a word "outer periphery" is simply used to express the positional relation of each of the layers, it of course includes the case having other layer structures between each of the layers, similarly to the above described case.

For example, if needed, the seat layer (13a) is provided between the interlocked tube (3) and the resin layer (5). The seat layer (13a) is a layer for flatly smoothing the uneven shape of the outer periphery of the interlocked tube (3), and can be deformed following flexible property of the interlocked tube (3). Hence, the seat layer (13a) has certain thickness, for example, like a nonwoven fabric, and has a role of a cushion for the unevenness of the outer periphery of the interlocked tube (3). The seat layer is provided if needed. In the following descriptions, the cases where seat layers exist will be explained, but seat layers are not necessarily required. Therefore, illustrations of the seat layers are omitted in the following figures.

The internal-pressure-resistant reinforcing layer (7) is provided to the outer periphery of the resin layer (5). The internal-pressure-resistant reinforcing layer (7) is a reinforcing layer which mainly resists the internal pressure of the fluid flowing inside the interlocked tube (3). The internal-pressure-resistant reinforcing layer (9) is formed by a procedure in which metallic tapes with cross-sections of such as C shape or Z shape for example, are wound around the shielding layer with a short pitch, in a way in which they face with each other and overlap alternately in the axial direction.

Construction materials of the internal-pressure-resistant reinforcing layer (7) is determined in consideration of the corrosion resistance against corrosive gases such as hydrogen sulfide gas, coming from the corrosive crude oil etc. flowing inside the tube, and infiltrating into the reinforcing layer passing through the resin layer (5). For example, the low-carbon steel with the carbon content of less than 0.5%, which has been heat-treated in a predetermined manner and has acquired the necessary corrosion resistance with the sacrifice of about 20% strength reduction, can be used. The yield strength of the metallic tape used for the internal-pressure-resistant reinforcing layer (7) is in general about 1000 MPa.

The axial-force reinforcing layer (9) is provided to the outer periphery of the internal-pressure-resistant reinforcing layer (7). The axial-force reinforcing layer (9) is a reinforcing layer for mainly suppressing a deformation (an extension) of the interlocked tube (3) in the axial direction of the flexible tube (1). The axial-force reinforcing layer (9) is formed by a procedure in which two layers of reinforcing strips (15) described later are wound in the reverse direction to each other with a long pitch. The axial-force reinforcing layer (9) is deformable following the flexibility of the interlocked tube (3), A seat layer (13b) which is a resin tape made of polyethylene may be formed, if needed, between the internal-pressure-resistant reinforcing layer (7) and the axial-force reinforcing layer (9). Also, a seat layer (13c) which is a resin tape made of polyethylene may be formed between the two layers of reinforcing strips (15) wound spirally in the reverse directions to each other. For the material of the resin tape used for the seat layer, resin materials other than polyethylene may also be used, if they have both strength and corrosion resistance in the same degree as the polyethylene. The seat layers (13b) and (13c) can prevent the reinforcing members from rubbing with each other and wearing out when they follow the deformation of the flexible tube (1). Even in these cases, we use the expression that the axial-force reinforcing layer (9) is formed on the outer periphery of internal-pressure-resistant reinforcing layer (7), regardless of existence or absence of the seat layer.

To the outer periphery of the axial-force reinforcing layer (9), another seat layer (13d) is provided if needed. The seat layer (13d) is a layer for approximately flat-smoothing the uneven shape of the outer periphery of the axial-force reinforcing layer (9), and can deform following the flexible property of the interlocked tube (3). Since the seat layer (13d) has the same composition as the seat layer (13a), explanations of its composition are omitted.

The protective layer (11) is formed on the outer periphery of the seat layer (13d). The protective layer (11) is a layer for preventing sea water etc., for example, from infiltrating into the reinforcing layer. For the materials of the protective layer (11), for example, polyethylene-system resin and polyamide-system resin can be used. As described above, each of the layers constituting the flexible tube (1) can respectively follow bending deformations and torsion deformations of the flexible tube (1), and has flexibility.

Figure 2:
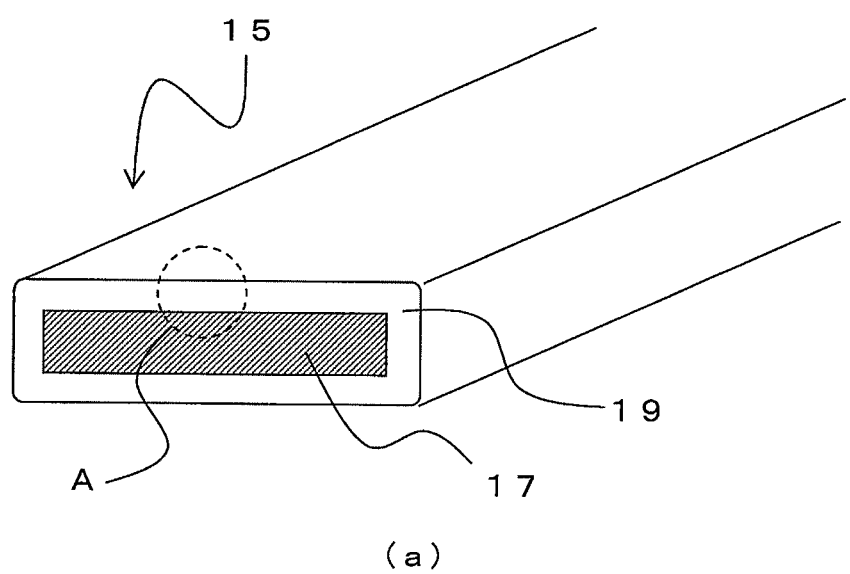
FIG. 2 show a reinforcing strip (15).
Figure 2:
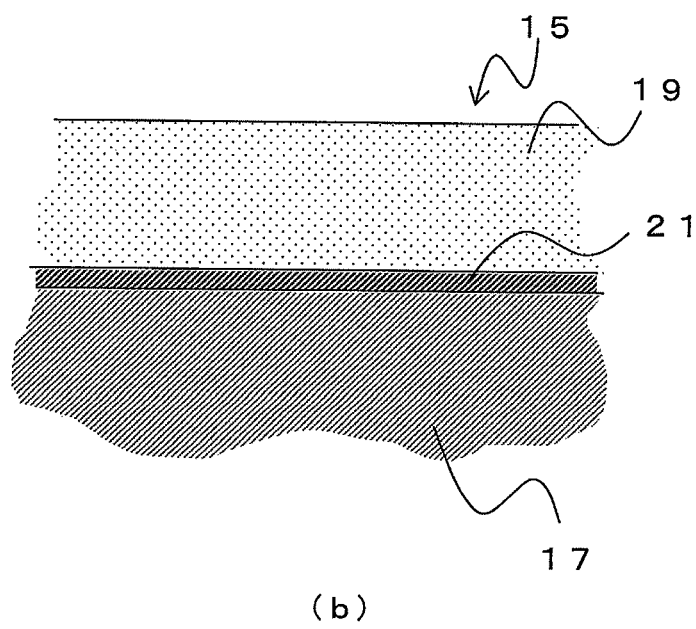

Next, the reinforcing strip (15) is explained. FIG. 2 show the reinforcing strip (15). FIG. 2(a) is a perspective view and FIG. 2(b) is the enlarged view of the region A in FIG. 2(a). The reinforcing strip (15) is configured from the metallic strip body (17), the resin layer (19) which coats the strip body (17) and the like.

For the strip body (17), high carbon steel with the carbon content of 0.8% or more is used, so that the flexible tube can tolerate deep sea with the depth of 2000 m or more, for example, and the strip body (17) has the yield strength of about 1700 MPa or more. Under the environment where the corrosive gases exist, it is known that strength of such a strip body (17) may decrease to about 50%. Thus, the strip body needs to acquire the corrosion resistance to the corrosive gases from the corrosive crude oil which flows inside the flexible tube.

The resin layer (19), which is a coating resin layer for coating the strip body (17), shields such corrosive gases. The resin layer (19) is a region made of resin and coats entire periphery of the strip body (17). Particulate sulfide-trapping material may be added to the resin of the resin layer (19), if needed. The resin should have: low permeability to water, chemicals and the like, good compatibility with sulfide-trapping material described later so that the resin can contain a lot of sulfide-trapping material, and also physical properties required for use in the tube body for fluid transport. Thus, for example, polyethylene and polyamide system resin can be used for this resin. In this way, the resin layer (19) can function as the sulfur shielding layer to shield hydrogen sulfide etc. when sulfide-trapping material is added to it or it is made of resin having low permeability to sulfides.

The strip body (17) is, for example, about 10-20 mm wide and about 3-6 mm thick. The resin layer (19) is formed by extrusion-coating the resin on the outer periphery of the strip body (17) in 1-3 mm thickness. In order to add sulfide-trapping material to the resin layer, the sulfide-trapping material may be blended into the resin beforehand.

The sulfide-trapping material should be such material that has little oil-water solubility before and after reacting with the sulfur components in the fluid; that generates sulfides very stable over a long term by the reaction with sulfur components, that has compatibility with the resin and can distribute uniformly well, and that reacts with sulfur components quickly enough. For example, an item chosen from among Zn, Sb, Pb, Fe and Cd series metals, compounds of these metals, and their compounds can be used. Taking into consideration the high reactivity with sulfur components and the high stability of the reaction product, Zn is desirable.

In order to make the sulfide-trapping material of the flexible tube (1) function efficiently, although it depends on the kind of the resin material or the sulfide-trapping material, it is desirable to add about 5 to 60 parts by mass of sulfide-trapping material to the resin, and it is more desirable to add 10 to 40 parts by mass. If the amount of sulfide-trapping material added is not sufficient, the function as the sulfur shielding layer may be lowered, and if it is too much, the flexibility of the flexible tube may get worse, and also the cost of sulfur shielding layer is not desirable. The sulfide-trapping material is, for example, in the state of about 1 μm fine particulates and is distributed approximately homogeneously in the resin material.

As shown in FIG. 2(b), it is desirable that a surface treatment layer (21) is formed on the surface of the strip body (17). The surface treatment layer (21) desirably has the corrosion resistance against hydrogen sulfide etc., and about 10 μm thick plating with Sn, Zn, Cu or Ti, etc. is suitable, for example. The surface treatment layer (21) is desirably formed all around the periphery of the strip body (17). The especially desirable plating material may be Zn, Ti, etc.

Figure 3:
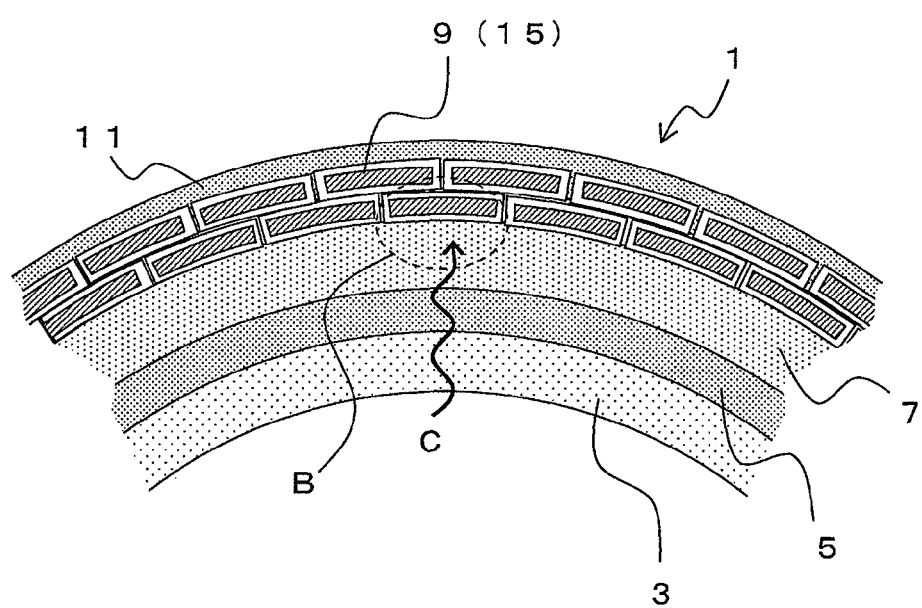
FIG. 3 is an enlarged cross-sectional view of the flexible tube (1).

Next, functions of the resin layer (19) are explained. FIG. 3 shows a cross section of the flexible tube (1). Fluid, such as oil etc. is flowing within the interlocked tube (3). Corrosive gases (for example, sulfides such as hydrogen sulfide) may be contained sometimes in the oil etc. as described above.

Since the interlocked tube (3) does not have fluid-tight nor air-tight properties, the resin layer (5) provided to the outer periphery of the interlocked tube (3) usually comes in contact with the fluid. That is, the sulfur components in the fluid contact with the resin layer (5). The sulfur components further passes through the resin layer (5), and infiltrates into the internal-pressure-resistant reinforcing layer (7) and the axial-force reinforcing layer (9) on the outer periphery of the resin layer (5) (shown by an arrow C in the figure). That is, the corrosive gases reach the reinforcing layers.

Here, since the internal-pressure-resistant reinforcing layer (7) has sufficient corrosion resistance as described above, strength reduction of the internal-pressure-resistant reinforcing layer (7) can be prevented. On the other hand, since the strip body (17) constituting the axial-force reinforcing layer (9) is inferior in the resistance to corrosion by the corrosive gases, it is necessary to prevent the corrosive gases from reaching the strip body (17) by resin layer (19).

Figure 4:
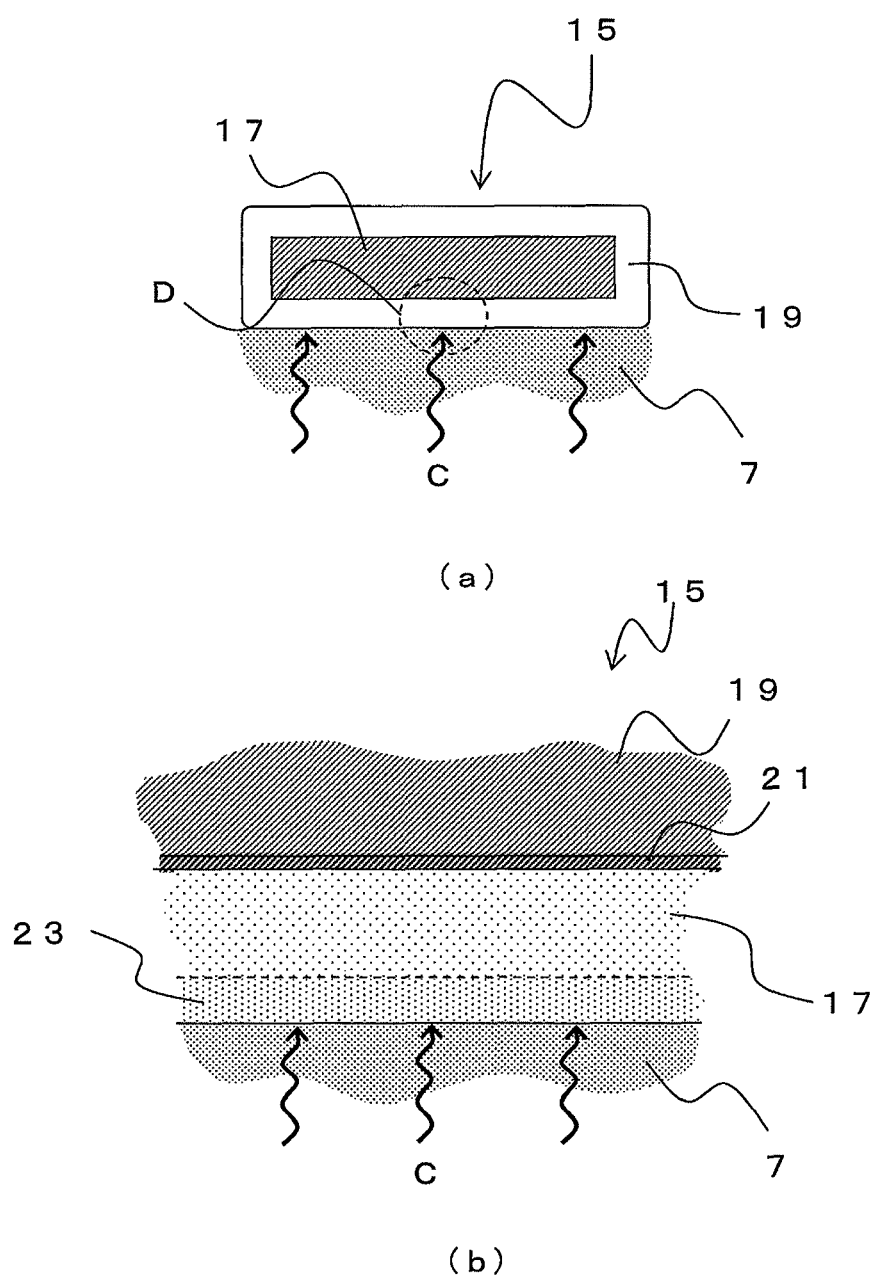
FIG. 4 are enlarged figures of the reinforcing strip (15).

FIG. 4(a) is an enlarged view of the region B in FIG. 3, and FIG. 4(b) is an enlarged view of the region D in FIG. 4(a). The corrosive gases which have passed through the internal-pressure-resistant reinforcing layer (7) arrive at the surface of the reinforcing strip (15) (the direction indicated by arrows C in the figure). Here, penetration of the corrosive gases can be prevented by the resin layer (19). Especially when the sulfide-trapping material is blended into the resin layer (19), hydrogen sulfide is prevented from penetrating into the strip body (17) by the sulfide-trapping material.

For example, a sulfur component $S^{2-}$ in the fluid reacts with a sulfide-trapping material $M^{2+}$, and a stable sulfide MS is formed. The sulfide-trapping material is not necessarily divalent, and as long as it can react with S and can generate a stable sulfide, it may be another metal (or an intermetallic compound). When the sulfur components contained in the fluid contact the resin layer (19), the sulfide-trapping material in the resin layer may react with the sulfur components, and may form stable sulfides.

The generated sulfides has a minute crystal structure, and as shown in FIG. 4(b), forms a reaction layer (23), which is a sulfur shielding section, on the surface side of the resin layer (19) (on the inner periphery side of the flexible tube (1)). Since the reaction layer (23) is configured from a stable and minute sulfide, the infiltration index (the diffusion coefficient) of the sulfur components (sulfur and sulfide) inside the reaction layer (23) is very small.

That is, the infiltration index (the diffusion coefficient) of sulfur components in the reaction layer (23) is very small as compared with regions of the resin layer other than the reaction layer (23). Therefore, once the reaction layer (23) with a certain thickness is formed, more growth of the reaction layer (23) in the thickness direction of the resin layer (19) (in the direction toward the strip body (17)) is suppressed. That is, the reaction layer (23) is formed so that it may spread in the axial direction of the resin layer (19) (the axial direction of the reinforcing strip (15)).

In this way, the resin layer (19) reacts with the sulfur components from within the fluid, and itself forms the reaction layer (23). Since the reaction layer (23) is formed as a layer on the surface of the resin layer (19), infiltration of the sulfur components through the resin layer (19) (namely, transfer in the direction toward the strip body (17)) can be certainly prevented.

Thickness of the reaction layer (23) is affected by the kinds of the resin material, the sulfide-trapping material and the like, and even in the case of the same sulfide-trapping material, it changes with the added amount of the trapping material.

For example, if the thickness of the reaction layer (23) is compared between the cases when low density polyethylene is used and when high density polyethylene is used as the base resin, it is thinner when the high density polyethylene having smaller water permeability is used. Similarly, the cases when low density polyethylene is used, and when plasticized polyvinyl chloride is used are compared, the thickness of the reaction layer (23) becomes thicker when the plasticized polyvinyl chloride having a larger water permeability is used.

When the added amount of the sulfide-trapping material is increased, the thickness of the reaction layer (23) becomes thinner, and when the added amount of the sulfide-trapping material is reduced, the thickness of the reaction layer (23) becomes thicker. Thus, although the thickness of the reaction layer (23) differs depending on various conditions, for example, when plasticized polyvinyl chloride is adopted and about 40 parts by mass of the sulfide-trapping material is added to it, the resin layer (19) is desirably 2 mm thick or more, and is still more desirably 2 to 3 mm thick in order to allow the formation of the reaction layer (23) possible to prevent diffusion of the sulfur components certainly. If the resin layer (19) is too thick, flexibility aggravation, weight rise, increase in cost and the like may be caused.

As explained above, according to the flexible tube (1) in the present embodiment, the penetration of the corrosive gases (or the sulfur components) contained in the fluid flowing inside the flexible tube can be prevented, since the resin layer (19) is provided to the outer periphery of the reinforcing strip (15). In particular, the sulfide-trapping material contained in the resin layer (19) reacts with the sulfide and can form a stable and minute reaction layer (23). Thus, corrosion of the strip body (17) caused by the sulfur components contained in the fluid which infiltrate into the resin layer (19) and leak onto the surface of the strip body (17), can be prevented.

Since the reaction layer (23) has a minute crystal structure, the diffusion coefficient of the sulfur components (including sulfide) in it is very small. Moreover, once the reaction layer (23) has had a certain thickness, growth of the reaction layer (23) beyond it in the thickness direction stops and the reaction layer (23) is uniformly formed on the outside surface of the resin layer (19). After that, the sulfur components coming from the fluid and the sulfide etc. existing in the reaction layer (23) do not diffuse into the inner surface of the resin layer (19). Accordingly, the sulfur components can be prevented from leaking into the strip body (17) certainly over a long time.

Further, since the surface treatment is performed to the surface of the strip body (17), the corrosion of the strip body (17) could be suppressed even if some part of hydrogen sulfide would arrive at the surface of the strip body (17). Also when the flexible tube (1) is used in low temperature area such as the deep sea, etc., the resin layer (19) has a useful internal heat insulation effect and aggravation of the fluid mobility can be prevented.

Figure 5:
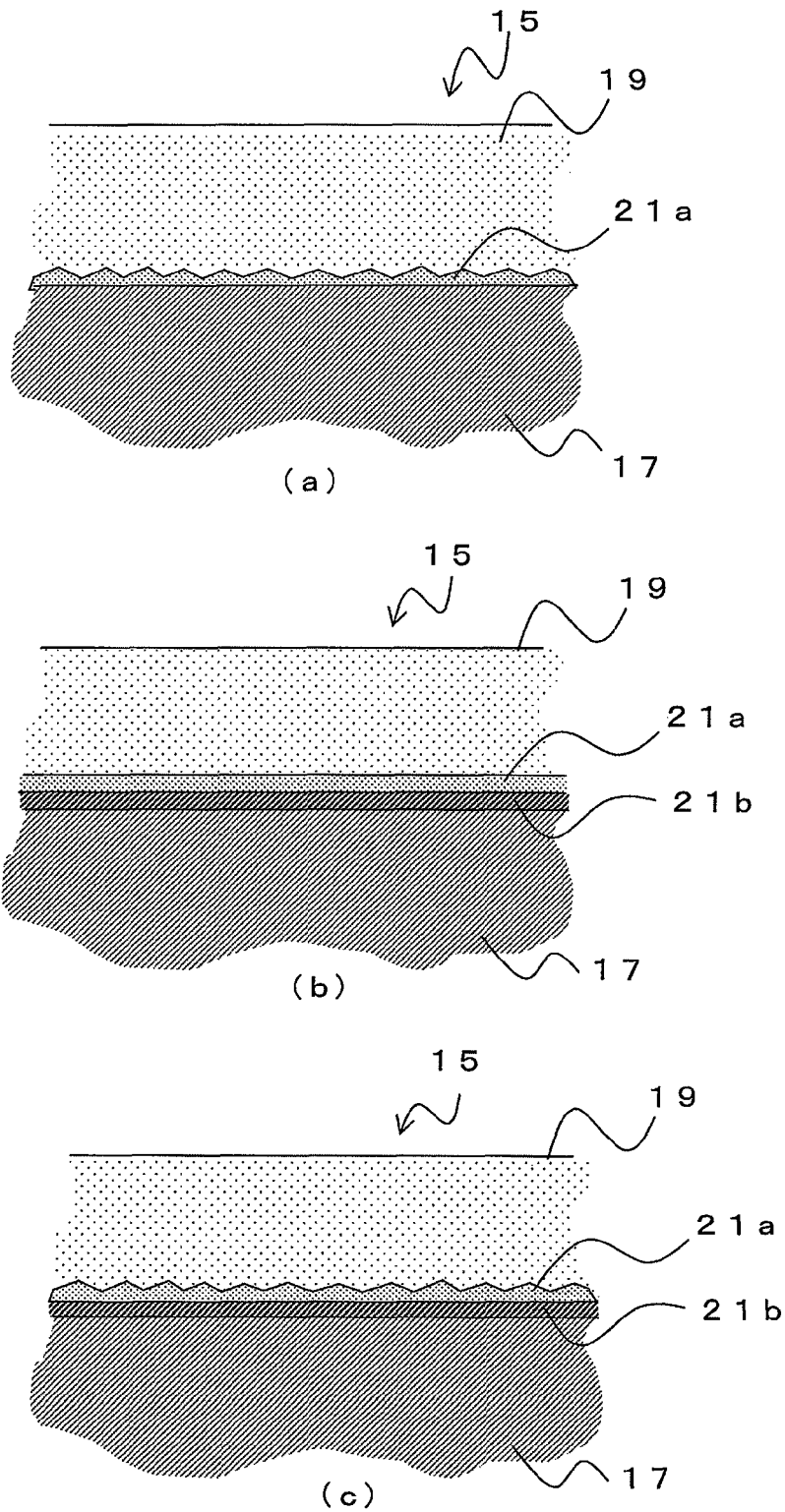
FIGS. 5(a)-(c) are enlarged cross-sectional views at the surface of the strip body (17).

The surface treatment layer (21) is not restricted to the example described above. FIG. 5 show other embodiments of the surface treatment layer. As shown in FIG. 5(a), a surface treatment layer (21a) which has unevenness on the surface may be formed on the surface of the strip body (17). An example of the surface treatment layer (21a) is a surface roughening treatment layer which is the surface of the strip body (17) on which surface blasting treatment etc. were directly performed. Owing to the surface treatment layer (21a), close adhesion between strip body (17) and the resin layer (19) can be improved. The same effect can be produced also by the plating treatment for roughening the surface.

As shown in FIG. 5(b), two or more surface treatment layers may be formed. For example, a surface treatment layer (21b) which is a plate layer, may be formed by plating the surface of the strip body (17) with Sn, Zn, Cu, etc. having high corrosion resistance. And on the surface of the surface treatment layer (21b), a surface treatment layer (21a) can be formed by plating with Ti etc., which further improves close adhesion to the resin layer.

As shown in FIG. 5(c), on the surface of the surface treatment layer (21b) with high corrosion resistance, a surface treatment layer (21a) having a roughened surface may be formed. In this case, the surface treatment layer (21a) may be formed by performing plating treatment having surface roughening effect on the surface treatment layer (21b), or by performing surface roughening treatment on the surface treatment layer (21b).

When two or more surface treatment layers are provided as shown in FIG. 5(b) and FIG. 5(c), both the effect of the surface treatment layer (21b) having high corrosion resistance and the effect of the surface treatment layer (21a) improving close adhesion can be obtained.

Chemical conversion treatment, such as degreasing, acid washing, phosphate or chromate treatment, etc. may be performed as a ground treatment of the strip body (17). Adhesive property to the coating resin can be improved by applying a primer to the strip body (17). For a primer, acrylic reactive resin, epoxy system reactive resin, urethane system reactive resin, or silane coupling agent are desirable.

A sulfide-trapping material may be further blended into the resin layer (5). Material of the resin layer (5) desirably has flexibility and excellent oil resistance since the resin layer (5) directly contacts the fluid and, for example, can be polyamide system resin. However, since it is not necessary to take oil resistance into consideration, the resin material of resin layer (19) is desirably made of polyethylene which has compatibility with the sulfide-trapping material and can contain more sulfide-trapping material.

Figure 6:
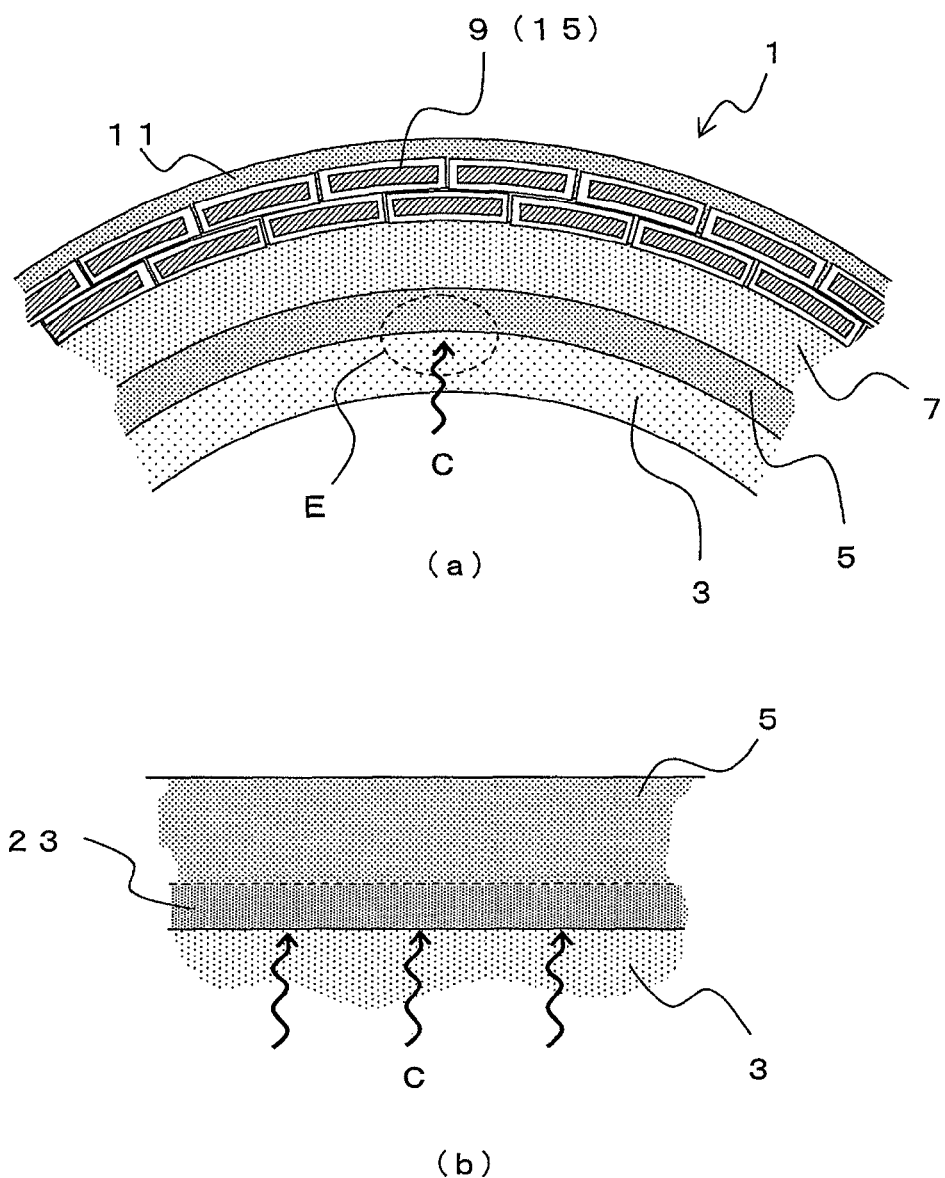
FIG. 6(a) is an enlarged cross-sectional view of flexible tube (1) provided with the resin layer (5), in which the sulfide-trapping material is blended.
FIG. 6(b) is the enlarged view of the region E in FIG. 6(a).

FIG. 6 show, similarly to FIG. 3, the function of the resin layer (5) containing the sulfide-trapping material. As shown in FIG. 6(a), the fluid flowing inside the interlocked tube (3) contacts the resin layer (5) (indicated by an arrow C in the figure).

The sulfur components arrived at the resin layer (5) react with the sulfide-trapping material in the resin layer (5), and as shown in FIG. 6(b), form the reaction layer (23), which is a sulfur shielding layer, on the inner periphery of the resin layer (5). Because the reaction layer (23) is made of a stable and minute sulfide as described above, the diffusion coefficient of the sulfur components (sulfur and sulfide) inside the reaction layer (23) becomes very small. Therefore, the resin layer (5) itself forms the reaction layer (23) to prevent infiltration of the sulfur components by reacting with the sulfur components coming from the fluid, and formation of the reaction layer (23) can certainly prevent the sulfur components from leaking out to the exterior of the resin layer (5).

By compounding the sulfide-trapping material to the resin layer (5), migration of the sulfur components to the strip body (17) can be prevented more certainly, and also migration of the sulfur components to the internal-pressure-resistant reinforcing layer (7) can be prevented.

In this case, a slipping layer may be provided if needed between the resin layer (5) and the internal-pressure-resistant reinforcing layer (7). The slipping layer may be a resin tape wound around the outer periphery of the resin layer (5), for example. The resin layer (5) becomes hard when a sulfide-trapping material is added, Thus, when the flexible tube (1) is bent or the like, the internal pressure-resistant reinforcing layer (7) which is a metal layer, may get damaged, or a crack, wear, etc. may arise in it, upon contacting the interface with the resin layer (5). The slipping layer solves this problem. As for the resin tape, any material sliding well on the internal-pressure-resistant reinforcing layer (7) can be used, and a polyester tape can be used, for example.

Figure 7:
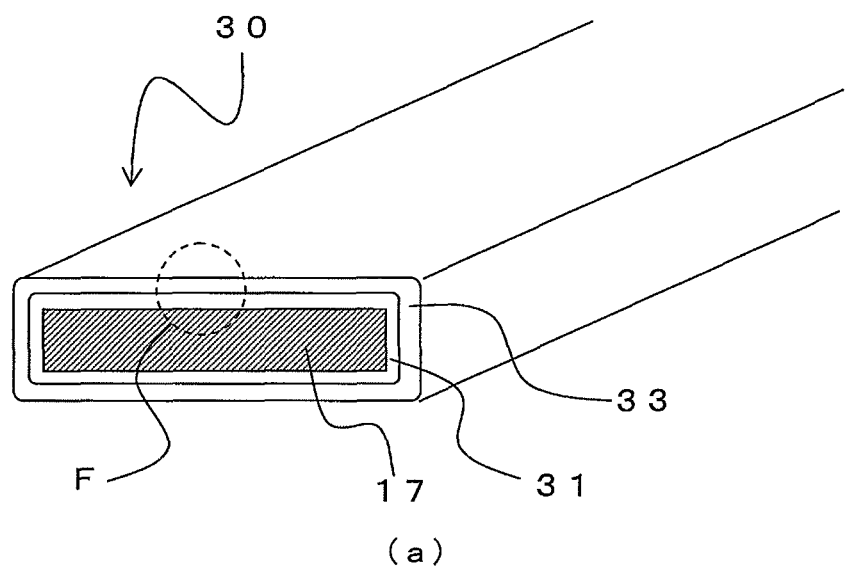
FIG. 7 show a reinforcing strip (15).
Figure 7:
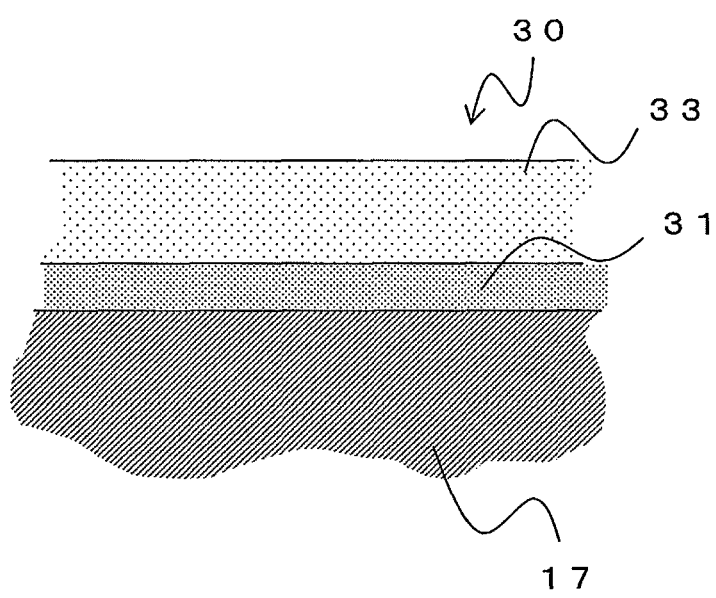

Next, other embodiments are described. FIG. 7 show a reinforcing strip (30). FIG. 7(a) is a perspective view and FIG. 7(b) is an enlarged view of the region F in FIG. 7(a). In the following explanation, the same numeral as in FIG. 3 is attached to the composition playing the same function as in the reinforcing strip (15) and the overlapping explanations are omitted.

Although the reinforcing strip (30) is nearly the same as the reinforcing strip (15), the reinforcing strip (30) is different in that two resin layers are formed. As shown in FIG. 7(b), the resin layers (31) and (33) are formed on the outer periphery of the strip body (17) in the reinforcing strip (30). That is, the resin layer (31) on the inner layer side, which is a coating resin layer, is formed on the outer periphery of the strip body (17).

The resin layer (33) on the outer layer side, which is an outer layer side resin layer, is formed on the outer periphery of the resin layer (31).

Although both of the resin layers (31) and (33) are layers for preventing the penetration of the corrosive gases into the strip body (17), the resin layer (31) is more excellent in the adhesive property with the strip body (17), than the resin layer (33).

The adhesive strength between the resin layer (31) and the strip body (17) is desirably 10 N/cm or more peel strength according to the 180° peel test prescribed by ISO8510-2-ASTMD903. By setting in this way, there is no exfoliation between the resin layer (31) and the strip body (17), withstanding repetitive bending of the flexible tube, and the corrosion accompanying the exfoliation can be prevented.

For the resin constituting the resin layer (31), the adhesive resin consisting of thermoplastics or thermosetting resin can be used.

For the adhesive resin consisting of thermoplastics, adhesive polyolefin system resin, adhesive fluorine system resin, and polyamide system hot melt resin are desirable.

The adhesive polyolefin system resin contains maleic anhydride modified polyethylene, maleic anhydride modified polypropylene, maleic anhydride modified ethylene-vinyl acetate copolymer, ethylene-maleic anhydride copolymer, ethylene-maleic anhydride-acrylic acid copolymer, ethylene-maleic anhydride-acrylic acid ester copolymer, ethylene-acrylic acid copolymer, ethylene-acrylic acid ester copolymer, ethylene-methacrylic acid copolymer, ethylene-vinyl acetate copolymer, and ionomer. Especially, maleic anhydride modified polyethylene, maleic anhydride modified polypropylene, and maleic anhydride modified ethylene-vinyl acetate copolymer are desirable.

As the adhesive fluorine system resin, maleic anhydride modified polyvinylidene fluoride (PVDF) and maleic anhydride modified ethylene-tetrafluoroethylene copolymer (ETFE) are desirable. As the polyamide system hot melt resin, dimer acid-based polyamide is desirable.

The resin layer (31) consisting of thermoplastics may be produced by extrusion-coating the resin on the reinforcing strip.

For the adhesive resin consisting of thermosetting resin, epoxy system resin, acrylic system resin, unsaturated polyester system resin, phenol system resin, melamine system resin, urea system resin, silicone series resin, urethane system resin and polyimide system resin are desirable. Each of these has excellent adhesive property to the strip body. In particular, epoxy system resin, urethane system resin, and polyimide system resin are desirable among them.

As the method for producing the resin layer (31) made of thermosetting resin, there are a spray coating method which spray-coats the reinforcing strip, a roll coating method, a reactive injection molding method, a dipping method, etc. Among them, the roll coating method is desirable in order to coat the reinforcing strip continuously and homogeneously.

When the operating temperature environment of the resin layer (31) is 80° C. or lower, adhesive polyolefin resin or polyamide system hot melt resin is desirable to be chosen, but when the operating temperature environment is 80° C. or higher, adhesive fluorine system resin or thermosetting resin is desirable to be chosen.

The resin layer (33) is more excellent in abrasion resistance than the resin layer (31). That is, even when bending is repeatedly given to the flexible tube (1), the resin layer is not worn out and the function as the shielding layer for the corrosive gases is not spoiled.

As for the abrasion resistance of the resin layer (33), it is desirable that its abrasion loss in the Taber abrasion test prescribed by ISO9352 ASTMD1044 is 30 mg/1000 times or less. By setting in this way, abrasion of the resin layer due to the repetitive bending of the flexible tube can be suppressed, and the corrosion accompanying the abrasion can be prevented.

For the resin constituting the resin layer (33), for example, polyethylene system resin, polypropylene system resin, polyamide system resin, fluorine system resin, polyester system resin, acrylic system resin, styrene system resin, polyvinyl chloride (PVC), modified polyphenylene ether (modified PPE), polyphenylene sulfide (PPS) and the like can be used.

For the polyethylene system resin, resins excellent in the abrasion resistance such as high density polyethylene (HDPE) and cross-linked polyethylene (XLPE), are desirable.

For the polypropylene system resin (PP), resins excellent in abrasion resistance such as homopolymer, block copolymer and random copolymer, are desirable. For the polyamide system resin, resins excellent in the coating property and in the abrasion resistance, such as polyamide 6 (PA6), polyamide 11 (PA11), and polyamide 12 (PA12), are desirable.

As for the fluorine system resin, resins excellent in the coating property and in the abrasion resistance, such as polyvinylidene fluoride (PVDF) and ethylene-tetrafluoroethylene copolymer (ETFE), are desirable.

As for the polyester system resin, polyethylene terephthalate (PET) and polybutylene terephthalate (PBT) can be used. As for the styrene system resin, polystyrene (PS), an acrylonitrile-styrene copolymer (AS), and acrylonitrile-butadiene-styrene copolymer (ABS) can be used. As for the acrylic system resin, polymethylmethacrylate (PMMA) can be used.

When the operating temperature environment of the resin layer (33) is 80° C. or lower, polyethylene system resin, polypropylene system resin, polystylene resin, polyvinyl chloride, polyamide system resin, polyester system resin or acrylic system resin is desirable to be chosen. And when the operating temperature environment is 80° C. or higher, fluorine system resin, modified polyphenylene ether, or polyphenylene sulfide is desirable to be chosen.

Since the temperature of crude-oil is getting higher with the change in the oil field location toward deeper sea in recent years, it is desirable to choose a combination of resins suitable for operating temperature environment of 80° C. or higher, for the resin layer (31) on the inner layer side and the resin layer (33) on the outer layer side of the reinforcing strip. As a concrete combination, maleic anhydride modified polyvinylidene fluoride or epoxy system resin is preferably used for the resin layer (31), and polyvinylidene fluoride is preferably used for the resin layer (33). In the case of the tube structure having a heat insulating material on the inner periphery of the reinforcing layer, both resin layers of the reinforcing strip can be made of resins suitable for 80° C. or lower operating temperature environment due to heat insulating effect of the insulating material. As a concrete combination, usage of maleic anhydride modified polyethylene for the resin layer (31), and polyethylene system resin or polyamide system resin for the resin layer (33) is preferable.

As for producing the resin layer (33), the resin layer (33) may be extrusion-coated onto the reinforcing strip coated by the resin layer (31), or the resin layer (33) and the resin layer (31) may be extrusion-coated simultaneously.

Because the reinforcing strip of the present invention may receive high contact pressure when it is wound around the flexible tube, compressive resistance is needed especially for the resin layer (31) as well as the adhesive property. However, these properties may have a relationship conflicting with each other depending on the selected resin, and it is difficult to solve this problem only by the resin. To solve this problem, it is desirable to add an inorganic filler at least to the resin layer (31) and if needed, to both of the resin layers (31) and (33). Thereby, especially in the resin layer (31), compressibility can be improved with adhesive property being maintained.

The inorganic filler is desirably chosen from among glass fiber, carbon fiber, silica, talc, mica, clay, calcium carbonate, magnesium hydroxide, aluminum hydroxide, hydrotalcite, etc. For the sake of improved compatibility with the resin, the material on which surface treatment is carried out with a silane system coupling agent, an aluminum system coupling agent, a titanate system coupling agent, fatty acid, etc. is still more desirable. The addition amount of the inorganic filler is desirably 10 to 100 parts by mass against 100 parts by mass of the resin. When the addition of the inorganic filler is less than 10 parts by mass, its effect is not obtained, and when the addition exceeds 100 parts by mass, undesirable effects such as fall of adhesiveness and reduction of the tensile characteristics and the impact property are seen.

Further, if necessary, the microparticulate sulfide-trapping material as described above may be added to at least either the resin layers (31) or (33). The resin layers (31) and (33) can be made to function as a sulfur shielding layer by being blended with sulfide-trapping material in this way, or by being made of a resin having low permeability to sulfide, so that they shield sulfide.

EXAMPLES

Next, evaluation result about the characteristics of each of resin layer (31) and (33) described above is explained. First, peel strengths of several kinds of resins for constituting the resin layer (31) were evaluated. The result is shown in Table 1.

TABLE 1

| Resin | Peel strength N/cm | Corrosion (Visual confirmation) | Judgment |
|---|---|---|---|
| Acid modified EVA | More than 50 | None | Good |
| Acid modified PE | 40 | None | Good |
| Acid modified PVDF | 10 | None | Good |
| HDPE | 0 | Exist | Bad |
| PA11 | 0 | Exist | Bad |
| PVDF | 0 | Exist | Bad |

The peel strength was evaluated by the 180° peel test prescribed by ISO8510-2 ASTMD903. Acid modification means maleic anhydride modification. EVA is ethylene-vinyl acetate copolymer; PE is polyethylene; PVDF is polyvinylidene fluoride; HDPE is high density polyethylene; and PA11 is polyamide 11.

Corrosion was evaluated by visual confirmation of the state of corrosion on the metal surface. "Exist" means that existence of corrosion was visually confirmed and "None" means that no corrosion was visually confirmed. The judgment was done by the existence or non-existence of corrosion. As a result, corrosion was not seen on the resin having the peel strength of 10 N/cm or more in the above test. Such resins were acid modified PE, acid modified EVA, and acid modified PVDF.

Next, the abrasion resistance of several kinds of resins for constituting the resin layer (33) were evaluated. The results are shown in Table 2.

TABLE 2

| Resin | Abrasion resistance mg/1000times | Judgment |
|---|---|---|
| HDPE | 20-30 | Good |
| XLPE | 30 | Good |
| PP | 20-30 | Good |
| PA6 | 5-10 | Good |
| PA11 | 20 | Good |
| PA12 | 23 | Good |
| PVDF | 5-10 | Good |
| EVA | More than 50 | Bad |
| EP rubber | More than 100 | Bad |
| Silicone rubber | More than 100 | Bad |

The abrasion resistance was evaluated by the abrasion loss in the Taber abrasion test prescribed by ISO9352 ASTMD1044. In the table: XLPE is cross-linked polyethylene; PP is polypropylene; PA6 is polyamide 6; PA12 is polyamide 12; and EP rubber is ethylene propylene rubber.

When the abrasion loss in the above-described test was 30 mg/1000 times or less, the abrasion resistance was judged excellent. The result shows that HDPE, XLPE, PP, PA6, PA11, PA12 and PVDF have high abrasion resistance.

As described above, the embodiments of the present invention have been explained referring to the accompanying figures. The technical scope of the present invention is, however, not restricted by the embodiments described above. It is clear that persons skilled in the art can think of various kinds of examples of modification or examples of revision within the scope of the technical idea described in the claims, and it is understood that those also reasonably belong to the technical scope of the present invention.

EXPLANATION OF NUMERALS

1 . . . Flexible tube
3 . . . Interlocked tube
5 . . . Resin layer
7 . . . Internal-pressure-resistant reinforcing layer
9 . . . Axial-force reinforcing layer
11 . . . Protective layer
13a, 13b, 13c and 13d . . . Seat layer
15 and 30 . . . Reinforcing strip
17 . . . Strip body
19 . . . Resin layer
21, 21a and 21b . . . Surface treatment layer
23 . . . Reaction layer
31, 33 . . . Resin layer

What is claimed is:
1. A flexible tube for fluid transport, comprising at least:
a tube body having flexibility,
a resin layer provided to the outer periphery of said tube body,
an internal pressure-resistant reinforcing layer provided to the outer periphery of said resin layer,
an axial-force reinforcing layer provided to the outer periphery of said internal-pressure-resistant reinforcing layer, and
a protective layer provided to the outer periphery of said axial-force reinforcing layer, wherein:
said axial-force reinforcing layer is formed from reinforcing strips comprising a metallic strip body coated by coating resin;
the adhesive strength between said coating resin and said strip body has the peel strength of 10 N/cm or more according to the 180° peel test prescribed by ISO8510-2 ASTMD903;

said coating resin is made of adhesive resin chosen from among adhesive polyolefin system resin, adhesive fluorine system resin, polyamide system hot melt resin, epoxy system resin, acrylic system resin, unsaturated polyester system resin, phenol system resin, melamine system resin, urea system resin, silicone system resin, urethane system resin, and polyimide system resin;

an outer layer side resin layer is further provided to the outer periphery of said coating resin, and thus the resin layer on the outer periphery of said strip body has at least two-layer structure;

the abrasion resistance of said outer layer side resin layer has the abrasion loss of 30 mg/1000 times or less in the Taber abrasion test prescribed by ISO9352 ASTMD1044; and said outer layer side resin layer is made of a resin chosen from among polyethylene system resin, polypropylene system resin, polyamide system resin, fluorine system resin, polyester system resin, acrylic system resin, styrene system resin, polyvinyl chloride, modified polyphenylene ether, and polyphenylene sulfide.

2. The flexible tube for fluid transport according to claim 1, wherein: surface treatment is performed on the surface of said strip body.

3. The flexible tube for fluid transport according to claim 2, wherein: surface roughening treatment or plating process for roughening the surface is performed on the surface of said strip body.

4. The flexible tube for fluid transport according to claim 2, wherein: said strip body is made of high carbon steel with the carbon content of 0.8% or more, and a plating treatment layer containing Sn, Zn, Cu, or Ti as the main ingredient is formed on the surface of said strip body.

5. The flexible tube for fluid transport according to claim 2, wherein:
    said strip body is made of high carbon steel with the carbon content of 0.8% or more; and
    on the surface of said strip body, a clad layer is formed by cladding low-carbon steel or aluminum on the surface of said strip body.

6. The flexible tube for fluid transport according to claim 1, wherein: at least either said coating resin or said outer layer side resin layer functions as a sulfur shielding layer and the resin constituting said coating resin or constituting said outer layer side resin layer is blended with a sulfide-trapping material which can react with sulfur and/or sulfides; and said sulfide-trapping material is chosen from among Zn, Sb, Pb, Fe and Cd series metals, compounds of these metals, and their complexes.

7. The flexible tube for fluid transport according to claim 6, wherein:
    at the surface region of the resin constituting said coating resin or constituting said outer layer side resin layer, a reaction layer is formed while the flexible tube is in use, due to the reaction of the sulfur components contained in the fluid flowing within said tube body with said sulfide-trapping material; and
    the infiltration index of the sulfur components into said reaction layer is smaller than its infiltration index into resin regions other than said reaction layer.

* * * * *